(12) United States Patent
Thiel

(10) Patent No.: US 11,603,976 B2
(45) Date of Patent: Mar. 14, 2023

(54) MOTOR VEHICLE HEADLAMP AND METHOD FOR OPERATING A MOTOR VEHICLE HEADLAMP

(71) Applicant: Volkswagen Aktiengesellschaft, Wolfsburg (DE)

(72) Inventor: Alexander Thiel, Schwuelper (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/666,211

(22) Filed: Feb. 7, 2022

(65) Prior Publication Data

US 2022/0252236 A1 Aug. 11, 2022

(30) Foreign Application Priority Data

Feb. 8, 2021 (DE) ...................... 10 2021 201 145.4

(51) Int. Cl.
| | | |
|---|---|---|
| *F21S 41/50* | (2018.01) | |
| *F21S 41/663* | (2018.01) | |
| *F21S 41/43* | (2018.01) | |
| *F21S 41/24* | (2018.01) | |
| *F21S 45/47* | (2018.01) | |

(52) U.S. Cl.
CPC ............. *F21S 41/663* (2018.01); *F21S 41/24* (2018.01); *F21S 41/43* (2018.01); *F21S 45/47* (2018.01)

(58) Field of Classification Search
CPC .. B60Q 1/0047; B60Q 1/0058; B60Q 1/0041; B60Q 1/0052; B60Q 1/381; B60Q 1/2607; B60Q 1/34; B60Q 2400/20; B60Q 2900/10; B60Q 1/0011; F21L 4/02; B60R 1/1207; B60R 1/12; F21W 2103/60; F21W 2103/45; F21W 2103/35; F21W 2103/10; F21W 2102/00; F21W 2103/00; F21W 2107/10; F21W 2103/20; F21Y 2115/10;
(Continued)

(56) References Cited

U.S. PATENT DOCUMENTS

| | | |
|---|---|---|
| 4,680,678 A | 7/1987 | Iwaki |
| 5,125,714 A | 6/1992 | Lecher |

(Continued)

FOREIGN PATENT DOCUMENTS

| | | |
|---|---|---|
| CN | 100593485 C | 3/2010 |
| CN | 202156349 U | 3/2012 |

(Continued)

OTHER PUBLICATIONS

Search English translation of WO-2015135962-A1 (Year: 2015).*

*Primary Examiner* — Omar Rojas Cadima
(74) *Attorney, Agent, or Firm* — Muncy, Geissler, Olds & Lowe, P.C.

(57) ABSTRACT

A motor vehicle headlamp that includes a housing in which at least one main light source is arranged. Detachably attached to an external lens of the motor vehicle headlamp is at least one front housing, which has a light-guiding element and lamps for coupling light rays into the light-guiding element. The light rays are coupled out of the light-guiding element through an output structure. Further additional lamps that can give off light rays are arranged side by side in front of the external lens. The light rays given off by the lamps pass through the external lens and the front housing in the direction of an outside environment.

11 Claims, 12 Drawing Sheets

(58) Field of Classification Search
CPC ........ F21S 43/237; F21S 41/24; F21S 43/235;
G02B 6/0028
See application file for complete search history.

(56) References Cited

U.S. PATENT DOCUMENTS

| | | |
|---|---|---|
| 7,182,398 B2 | 2/2007 | Lin |
| 7,281,823 B2 | 10/2007 | Moisel |
| 7,401,956 B2 | 7/2008 | Larson et al. |
| 7,641,371 B2 | 1/2010 | Effner et al. |
| 7,946,743 B2 | 5/2011 | Natsume et al. |
| 8,408,768 B2 | 4/2013 | Schneider et al. |
| 9,333,905 B2* | 5/2016 | Nomura ............... F21S 41/176 |
| 9,506,619 B2 | 11/2016 | Buisson |
| 10,125,943 B2 | 11/2018 | Thiel et al. |
| 2002/0012251 A1 | 1/2002 | Lee |
| 2004/0130904 A1 | 7/2004 | Yamada et al. |
| 2008/0180970 A1 | 7/2008 | Mertens |
| 2009/0175047 A1 | 7/2009 | Tsai |
| 2012/0069592 A1 | 3/2012 | Natsume et al. |
| 2013/0314935 A1 | 11/2013 | Tokieda et al. |
| 2013/0343074 A1 | 12/2013 | Tsukamoto |
| 2016/0159273 A1* | 6/2016 | Nakazato ............... F21S 41/24 315/79 |
| 2016/0193954 A1* | 7/2016 | Nakada ............... B60Q 1/2696 362/511 |
| 2019/0257490 A1* | 8/2019 | Herlin ............... G02B 6/0061 |

FOREIGN PATENT DOCUMENTS

| | | |
|---|---|---|
| CN | 102997153 A | 3/2013 |
| CN | 103153702 A | 6/2013 |
| DE | 3928327 C1 | 11/1990 |
| DE | 19933713 A1 | 1/2001 |
| DE | 19943255 A1 | 3/2001 |
| DE | 10036323 A1 | 2/2002 |
| DE | 10208140 A1 | 9/2003 |
| DE | 10340723 A1 | 4/2005 |
| DE | 10337617 B4 | 5/2005 |
| DE | 10332977 A1 | 7/2005 |
| DE | 102004039004 A1 | 2/2006 |
| DE | 102004013775 B4 | 3/2006 |
| DE | 102006007134 A1 | 8/2007 |
| DE | 102006014226 A1 | 10/2007 |
| DE | 102006017780 A1 | 10/2007 |
| DE | 102006059904 A1 | 6/2008 |
| DE | 102007005551 A1 | 7/2008 |
| DE | 202008009015 U1 | 9/2008 |
| DE | 102007018678 A1 | 10/2008 |
| DE | 102008003915 A1 | 7/2009 |
| DE | 102008059322 A1 | 6/2010 |
| DE | 102009034954 A1 | 2/2011 |
| DE | 102009039038 A1 | 3/2011 |
| DE | 202011100750 U1 | 7/2011 |
| DE | 102010006974 A1 | 8/2011 |
| DE | 102011119379 A1 | 5/2013 |
| DE | 102015204303 A1 | 9/2015 |
| EP | 1070633 A2 | 1/2001 |
| EP | 1391348 A2 | 2/2004 |
| EP | 1459934 A2 | 9/2004 |
| EP | 1835224 A1 | 9/2007 |
| EP | 2071228 A2 | 6/2009 |
| EP | 2338732 A1 | 6/2011 |
| EP | 2481978 A1 | 8/2012 |
| FR | 2831647 A1 | 5/2003 |
| FR | 2917348 A1 | 12/2008 |
| FR | 2979414 A1 | 3/2013 |
| JP | H07201209 A | 8/1995 |
| JP | 2011129250 A | 6/2011 |
| JP | 2011198536 A | 10/2011 |
| JP | 2012199155 A | 10/2012 |
| JP | 7045102 B1 | 3/2022 |
| WO | WO2006018067 A1 | 2/2006 |
| WO | WO2013075792 A2 | 5/2013 |
| WO | WO-2015135962 A1 * | 9/2015 ........... B60Q 1/0035 |

\* cited by examiner

MOTOR VEHICLE HEADLAMP AND METHOD FOR OPERATING A MOTOR VEHICLE HEADLAMP

This nonprovisional application claims priority under 35 U.S.C. § 119(a) to German Patent Application No. 10 2021 201 145.4, which was filed in Germany on Feb. 8, 2021, and which is herein incorporated by reference.

BACKGROUND OF THE INVENTION

Field of the Invention

The present invention relates to a motor vehicle. The invention also relates to a method for operating a motor vehicle headlamp.

Description of the Background Art

A motor vehicle headlamp has become known from DE 10 2015 204 303 A1, which corresponds to US 2016/0377254, which is incorporated herein by reference. Concretely, this document describes a motor vehicle headlamp with a front housing that has a light guide, a lamp associated with the light guide, and a heat sink for cooling the lamp. By means of the lamp together with the light guide, it is possible to achieve different lighting functions, such as the lighting function of a daytime running light or of a directional indicator.

SUMMARY OF THE INVENTION

It is therefore an object of the present invention to provide a motor vehicle headlamp in which it is possible to create the basic requirements for greater functionality.

The present invention additionally has the object of proposing a suitable method for operating such a motor vehicle headlamp.

The invention is based, firstly, on a motor vehicle headlamp that comprises the following: a housing in which at least one main light source is arranged; at least one additional lamp; at least one heat sink for cooling the at least one additional lamp; an at least partially transparent external lens that seals the housing from the outside environment of the motor vehicle headlamp and that has an inner side facing the interior of the housing and an external width facing the outside environment; at least one front housing that is arranged in front of the outer side of the external lens, wherein a light-guiding element is arranged in or on the front housing, which light-guiding element at least partially fills the interior of the front housing and is designed to guide light rays that are coupled in by means of the at least one additional lamp (wherein "light guiding" can be understood to mean the transmission of light rays using the laws of total internal reflection), wherein the front housing is joined to the housing and/or to the external lens of the motor vehicle headlamp in a nondestructively detachable manner by at least one fastening element.

"Main light source" can be understood within the meaning of the invention to be such a light source by means of which the lighting function of a low beam and/or of a high beam is realized.

According to the invention, it is now proposed that at least one further additional lamp is present that is arranged in the housing of the motor vehicle headlamp. In addition, the further additional lamp is arranged behind the light-guiding element, when viewed opposite a direction of light emission of the motor vehicle headlamp, in such a manner that light rays emitted by the further additional lamp can pass through the light-guiding element and through a front lens of the front housing and exit toward an outside environment.

With such a motor vehicle headlamp, the basic requirements are created for the motor vehicle headlamp to be able to provide greater lamp functionality. In particular, advanced functions or lighting effects can be achieved by superposition of light rays of the at least one additional lamp and of the at least one further additional lamp.

The front housing can be designed to be elongate and the light-guiding element can be designed as an elongate light guide that extends over at least a large part of a length of the front housing. In this case multiple further additional lamps are arranged side by side behind the light-guiding element, which lamps likewise extend at least over a large part of the length of the light guide. This is realized in such a manner that light rays emitted by the further additional lamps can pass through the light guide and the front lens of the front housing in the direction of an outside environment.

By means of the above features, the basic requirements are created such that a dynamic directional indicator—in which the illuminated area expands up to the maximum illuminated area when flashing, starting from the inside of the vehicle toward the outside of the vehicle (so-called "sweeping turn signaling")—can also be generated with the motor vehicle headlamp.

It is advantageous when the front housing is designed as a closed housing, in which the at least one additional lamp is arranged together with the light-guiding element at a minimum. In this case the front housing has a rear lens, preferably transparent, that extends over at least a large part of the length of the light-guiding element. As a result, a costly sealing of the front housing during its installation on the motor vehicle headlamp can be omitted. Furthermore, the light given off by the multiple further additional lamps can be utilized optimally.

It is useful when at least one control device for driving the further additional lamps is present in such a manner that the lamps can be switched on sequentially within a specific time period. In this way, a contribution can be made to the ability to realize a dynamic directional indicator with the motor vehicle headlamp.

The further additional lamps can be arranged behind a first part of the length of the light-guiding element and no further additional lamps are arranged behind a second, end part of the length of the light-guiding element.

In this way, it is possible to save on the further additional lamps and to reduce costs, wherein the requirements for realizing a dynamic directional indicator (sweeping turn signaling) are nevertheless met by the superposition of the light rays of the light-guiding element and the light rays of the further additional lamps arranged behind it.

The first part of the length of the light-guiding element can run horizontally or approximately horizontally, for example, while the second, end part of the length of the light-guiding element (forming an obtuse angle with the aforementioned first part) can run upward or downward. Other shapes of the light-guiding element are also possible.

In order to avoid parasitic light straying through the external lens upon activation of the at least one further additional lamp, it is useful for the external lens of the housing to have a light-passage region through which the light rays that can be emitted or are emitted by the at least one additional lamp can pass, wherein opaque regions are present above and below the light-passage region, viewed in a longitudinal section (which is to say in the x-direction) of the motor vehicle headlamp.

Such an example can be manufactured easily when the opaque regions are part of a two-component region of the external lens.

Alternatively, it is possible that the opaque regions are incorporated into the external lens in such a manner that the light-passage region is sealed off in a light-tight manner from the rest of the external lens by the opaque regions, at least toward the top and bottom, viewed in a longitudinal section of the motor vehicle headlamp. Even though this is more difficult to implement in manufacturing terms, an optimal suppression of parasitic light can be accomplished by this means.

Moreover, it is possible that the external lens has a labyrinthine shape above and below the light-passage region, viewed in a longitudinal section of the motor vehicle headlamp. In this way, as well, the occurrence of unwanted scattered light can be prevented or at least reduced in an effective manner and with simple means.

The present invention is also intended to propose a method for operating a motor vehicle headlamp according to the invention. In the method, in order to generate a dynamic directional indicator (sweeping turn signaling), all further additional lamps are switched on sequentially within a specific time period, starting from a further additional lamp that is located closest to the vehicle inner side. The specific time period is very short, amounting to only fractions of a second. At the same time as switch-on of a further additional lamp that is located closest to the vehicle outer side or thereafter, preferably immediately thereafter, the at least one further lamp associated with the light-guiding element is also switched on.

By means of this procedure, a dynamic directional indicator (sweeping turn signaling) can be generated with the motor vehicle headlamp according to the invention which has several of the further additional lamps.

Finally, the intent of the present invention is also to provide protection for a motor vehicle for carrying out the method, the vehicle having at least one motor vehicle headlamp according to the invention.

A "light-guiding element" can be be understood within the meaning of the invention to be such an element or component into which light from at least one light source is coupled, the light that is coupled in is transmitted using total internal reflection, and is coupled out again through suitable output structures.

Preferred exemplary embodiments of the invention are shown in the figures, and are explained in detail in the description below on the basis of the figures. Still further features and advantages of the invention are made apparent thereby. Identical reference symbols, even in different figures, refer to identical, comparable, or functionally identical components. Corresponding or comparable properties and advantages are achieved here, even when no repeated description or reference thereto is made. The figures are not true to scale, or at least not in all cases. Representations of proportions or distances may be exaggerated in some figures in order to be able to more clearly highlight features of an exemplary embodiment. When the term "and/or" is used in a list of two or more terms or objects, this can mean that any one of the listed terms or objects may be used alone. It can also mean that any combination of two or more of the listed terms or objects may be used.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The description refers firstly to FIGS. 1 to 3A.

Figure 1:
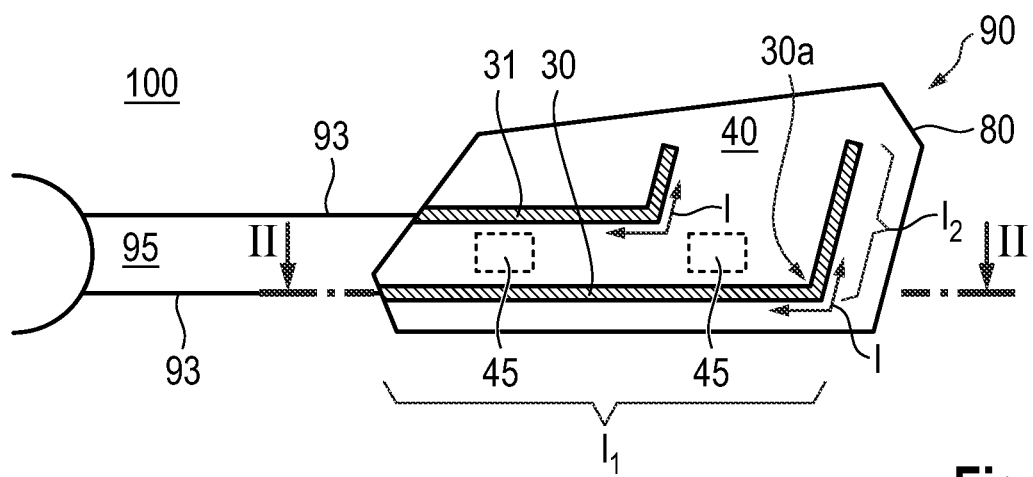
FIG. 1 is a partial front view of a motor vehicle with a headlamp according to the invention.
Figure 2:
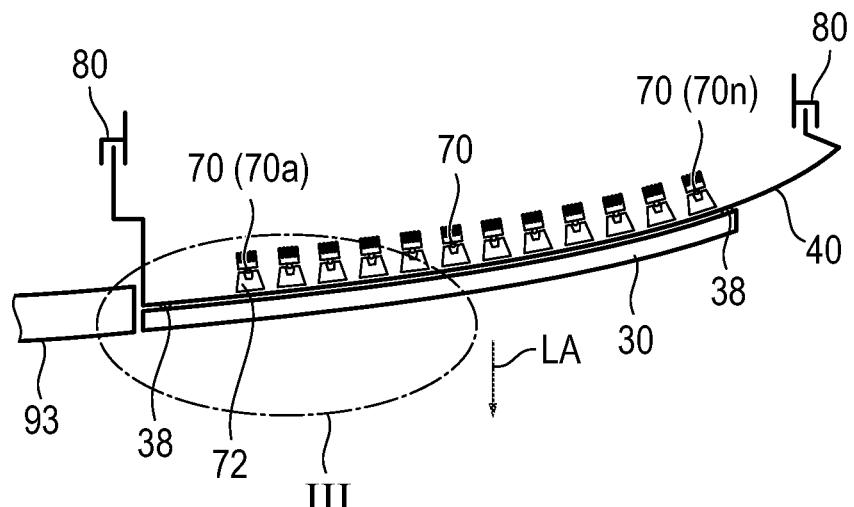
FIG. 2 is a sectional representation along section line II from FIG. 1.

A motor vehicle headlamp 90 can be seen therein, which is arranged in the region of a radiator grill 95 of a motor vehicle 100 (FIG. 1).

The motor vehicle headlamp 90 has a housing 80 that is covered toward the outside, which is to say toward the outside environment of the motor vehicle headlamp 90, by an external lens 40. The external lens 40 is transparent in the exemplary embodiment. It is also possible, however, that the external lens 40 has non-transparent regions or regions with a diffuser (for example, Fresnel or pillow optics).

It is further evident that two front housings 30 and 31 are mounted on the external lens 40. The front housings 30, 31 are held on the external lens 40 (and/or on the housing 80) so as to be nondestructively detachable through fastening elements 38 in the manner of a latching connection.

The front housings 30, 31 are designed to be elongate, and have a length I.

In a view of the motor vehicle headlamp 90 opposite a direction of light emission LA, the front housings 30, 31 have a wing-like contour, with a first part I1 and with a second part I2 located on the vehicle outer side (illustrated only for the front housing 30).

The first part I1 has an approximately horizontal orientation, while the second part I2 is angled upward at an obtuse angle to the first part I1. Formed between the parts I1 and I2 is a transition region 30a. The transition region 30a can also be curved in design.

Furthermore, it is possible that the front housings 30, 31 have different outlines, and are designed with a trough shape or a W-shape, for example.

The motor vehicle headlamp 90 is arranged with the front housings 30, 31 such that the first, horizontal parts I1 of the front housings 30, 31 form a horizontal extension of radiator grill fins 93 that extend horizontally.

Each of the front housings 30, 31 is closed in design and accommodates a light-guiding element 34, that preferably corresponds approximately to the length of the front housing 30, 31 or at least occupies a large part of its length.

The motor vehicle headlamp 90 also has main light sources 45, which serve to realize the lighting functions of a low beam and/or a high beam.

At least one additional lamp for implementing an additional lighting function is accommodated in each of the front housings 30, 31. In the exemplary embodiment, two additional lamps 60*a* and 60*b* are accommodated in the front housing 30, 31. The additional lamp 60*a* can emit yellow or orange light rays for generating the lighting function of a directional indicator, while the additional lamp 60*b* can emit white light rays for generating a daytime running light. The additional lamps 60*a*, 60*b* preferably are designed as light emitting diodes (LEDs) and are held on a heat sink 61, which preferably is likewise accommodated in the front housing 30, 31.

It is also possible for only a single additional lamp to be present that can emit light rays in different colors (for example, RGB LED).

Figure 3:
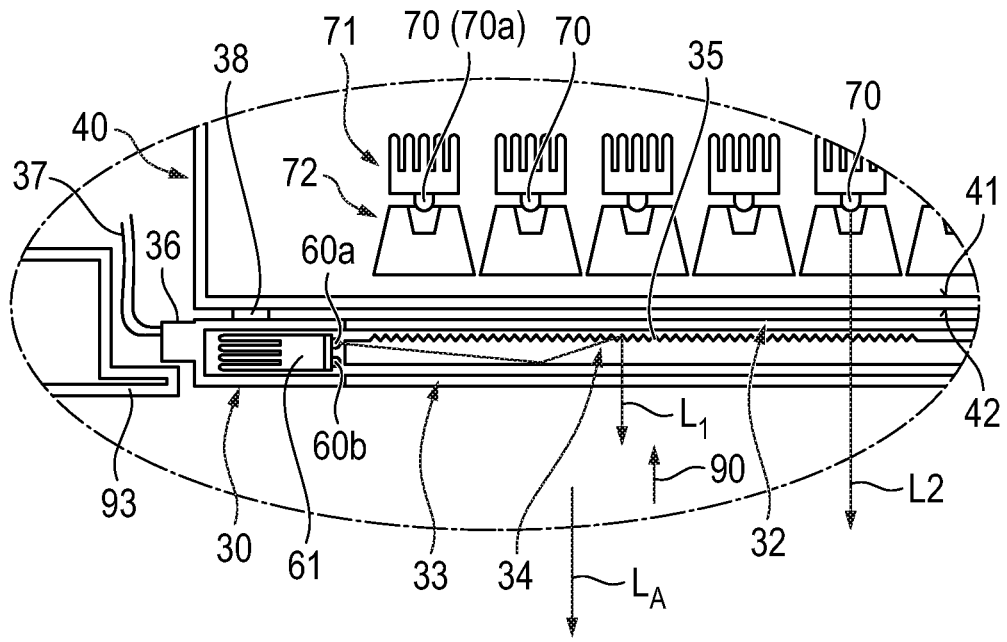
FIG. 3 is a detail view in accordance with detail III from FIG. 2.

For power supply, the additional lamps 60*a*, 60*b* are connected to supply cables 37 through a connector 36 (FIG. 3).

When one of the additional lamps 60*a*, 60*b* is switched on, it emits light rays, of which only one light ray L1 is illustrated by way of example.

The emitted light rays L1 are transported onward through the light-guiding element 34 in the longitudinal direction of the light-guiding element 34 as a result of total internal reflection, and are coupled out of the light-guiding element 34 again through a rear output structure 35 in a direction of light emission LA.

For the purpose of light output, the front housings 30, 31 each have a front lens 33 that is designed to be light-transmitting. The lens 33 can be provided with diffusers.

Viewed opposite the direction of light emission LA, which is to say in the direction of view toward the external lens 40 with the front housings 30, 31, a multiplicity of further additional lamps 70 are arranged behind each first part I1 of the front housings 30, 31. The further additional lamps 70 preferably are likewise designed as LEDs.

Each further additional lamp 70 is connected to a heat sink 71, by means of which the further additional lamp 70 can be cooled in operation.

In the direction of light emission LA, a directing optics element 72 is additionally associated with each lamp 70; the directing optics element preferably serves as collimator and parallelizes emitted light rays, of which one light ray L2 is illustrated by way of example.

The further additional lamps 70 are arranged with their directing optics elements 72 immediately in front of an inner side 41 of the external lens 40.

Furthermore, it is shown that each front housing 30, 31 has a rear lens 32, which faces an outer side 42 of the external lens 40. The rear lens 32 is likewise designed to be light-transmitting, preferably transparent.

In this way, it is possible that emitted light rays L2 of the further additional lamps 72, after exiting the directing optics element 72, pass through the external lens 40, through the rear lens 32, through the light-guiding element 34, and finally through the front lens 33, which is to say can pass through these components essentially transversely to their longitudinal or areal extents, even though deflections of the light rays L2 do occur to some extent during their passage.

As is explained further below, the further additional lamps 70, which preferably can also emit yellow or orange light, serve to realize a dynamic directional indicator (sweeping turn signaling), as is explained in detail further below. It is also possible that the additional lamps 70 are designed such that they can emit white light. This could then serve to implement a dynamic, which is to say animated, daytime running light.

For better understanding, the first further additional lamp 70 arranged on the vehicle inner side shall also be labeled 70*a*, and the last further additional lamp 70 located on the vehicle outer side shall also be labeled 70*n*.

Figure 3A:
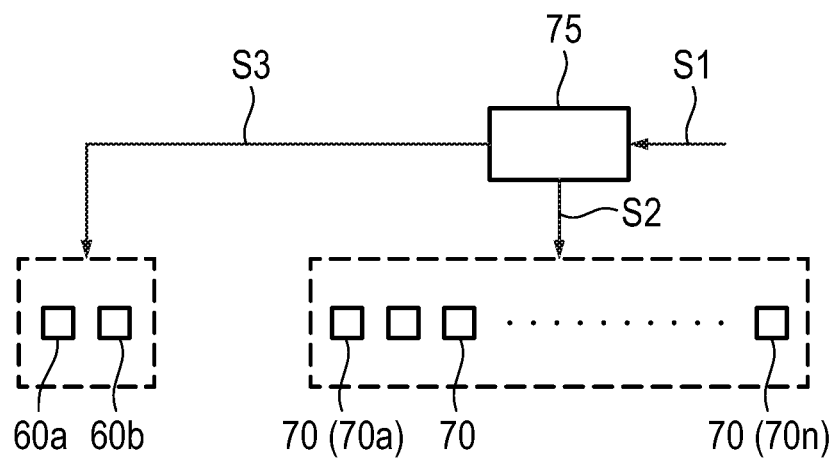
FIG. 3A is a signal flow diagram with a representation of a control device for driving the further additional lamps.

As is shown in outline form by FIG. 3A, a control device 75 is present that has a signaling connection to the lamps 70. When a directional indicator is actuated (to the left in the present case), a corresponding switching signal S1 is generated and issued to the control device 75. This causes the control device 75 to issue switching signals S2, by means of which the lamps 70, starting with the first lamp 70*a* located on the vehicle inner side, are driven and switched on sequentially in a specific time period. This continues until the last lamp 70*n* located on the vehicle outer side is also switched on. At switch-on of the last further additional lamp 70*n*, or shortly thereafter, the additional lamp 60*a* associated with the light-guiding element 34 is also switched on by the control device 75 through a switching signal S3. The driving of the additional lamp 60*b* (for generating the lighting function of a daytime running light) is deactivated for the time period of the implementation of the lighting function of a directional indicator.

Figure 4A:
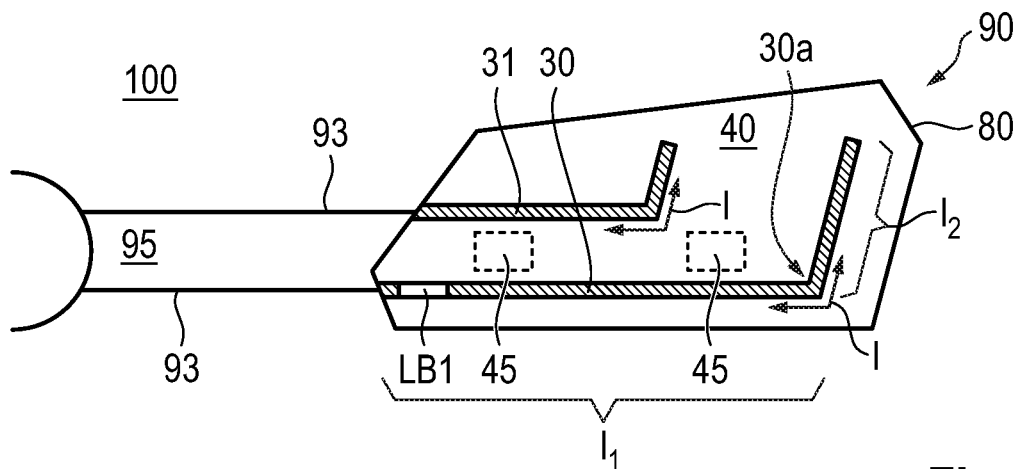
FIGS. 4A-4B, 5A-5B, 6A-6B, 7A-7B and 8A-8B are representations of the motor vehicle headlamp in multiple operating states.

The procedure for generating a dynamic directional indicator (sweeping turn signaling) shall be described again briefly on the basis of FIG. 4A-4B, 5A-5B, 6A-6B, 7A-7B and 8A-8B:

Thus, in FIG. 4A a view of the motor vehicle headlamp 90 can be seen that is comparable to FIG. 1. The illustration in FIG. 4B corresponds to the representation in FIG. 3. The driving of the individual further additional lamps 70 and of the additional lamp 60*a* is shown as well.

Figure 4B:
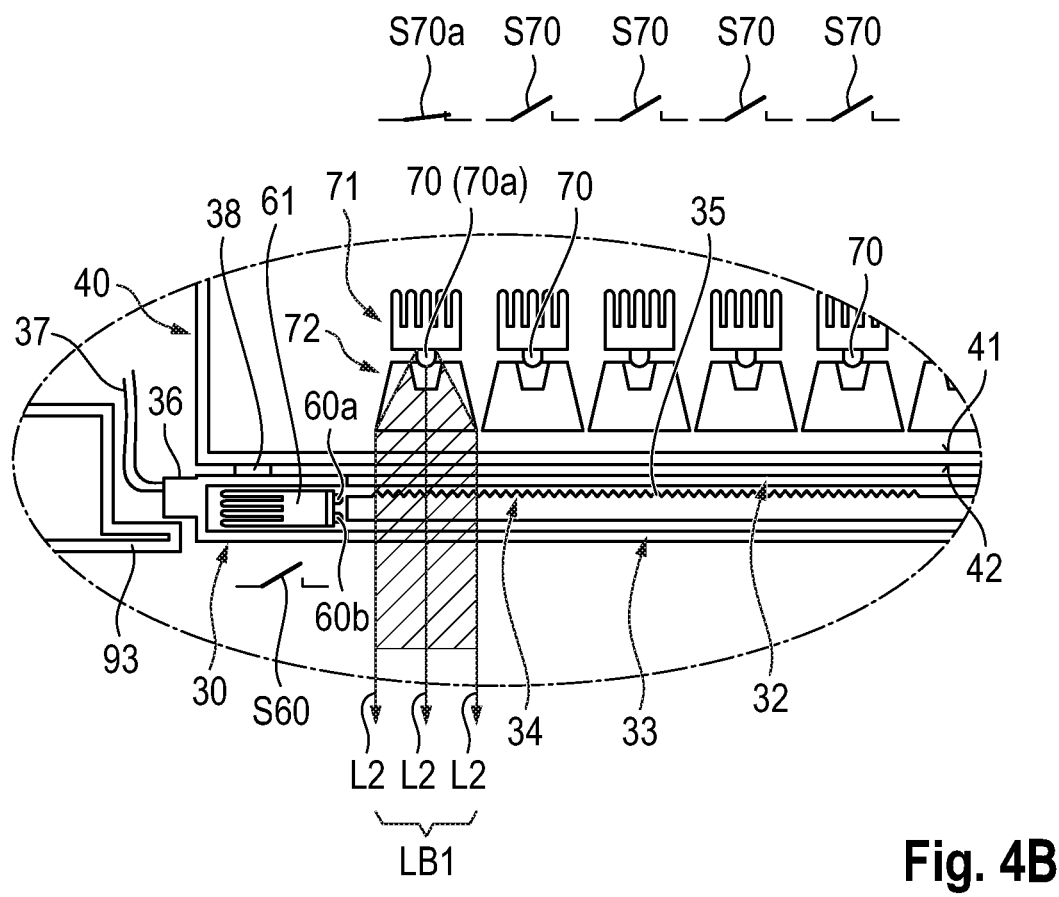

In FIG. 4A and 4B, the lamp 70*a* is controlled, which is indicated by a switching state S70*a* symbolized by a closed switch. The lamp 70*a* therefore emits light rays L2 that are parallelized by the directing optics element 72 and result in an illuminated region LB1 in a top view opposite the direction of light emission LA. The illuminated region LB1 is only a fraction of the length 1 of the front housing 30.

Figure 5A:
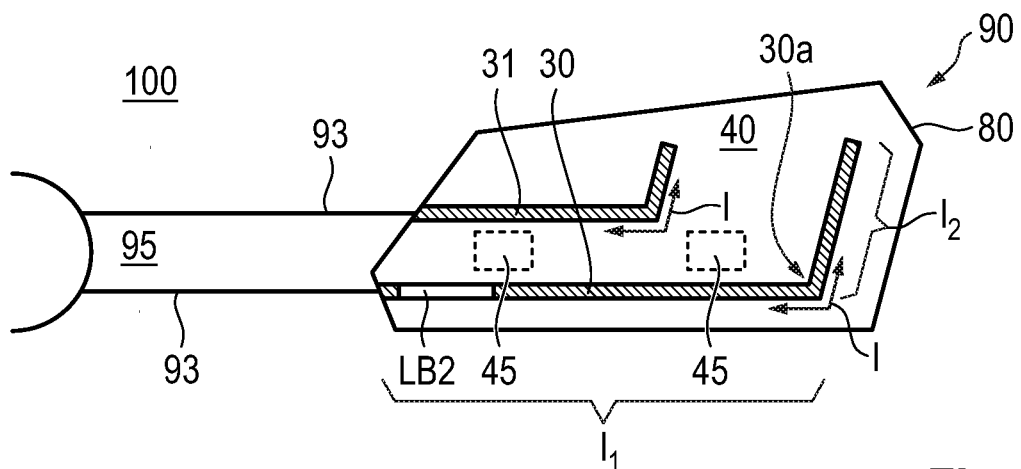
Figure 5B:
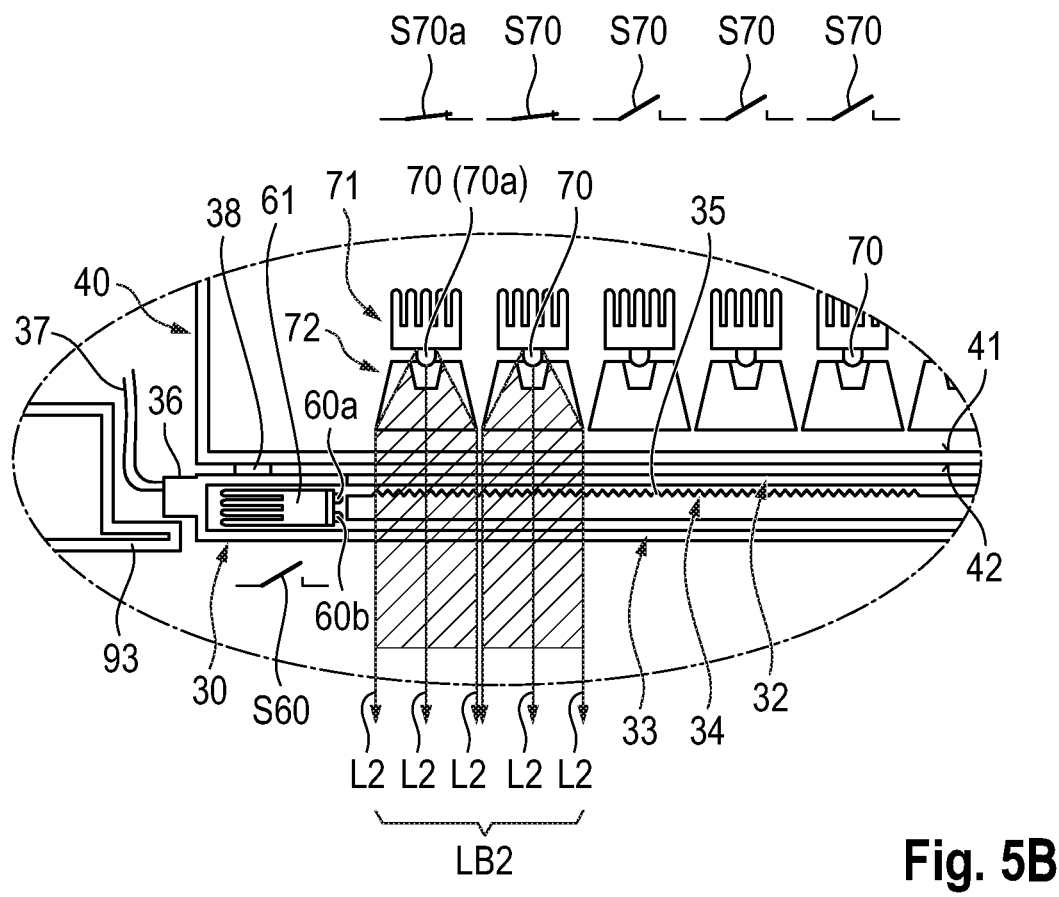

In FIGS. 5A and 5B, the adjacent lamp 70 located closer to the vehicle outer side is driven in addition to the lamp S70*a*, a circumstance that is indicated by an additional switching state S70 in the form of a closed switch. The result is an illuminated region LB2 that already has a greater length than the illuminated region LB1.

Figure 6A:
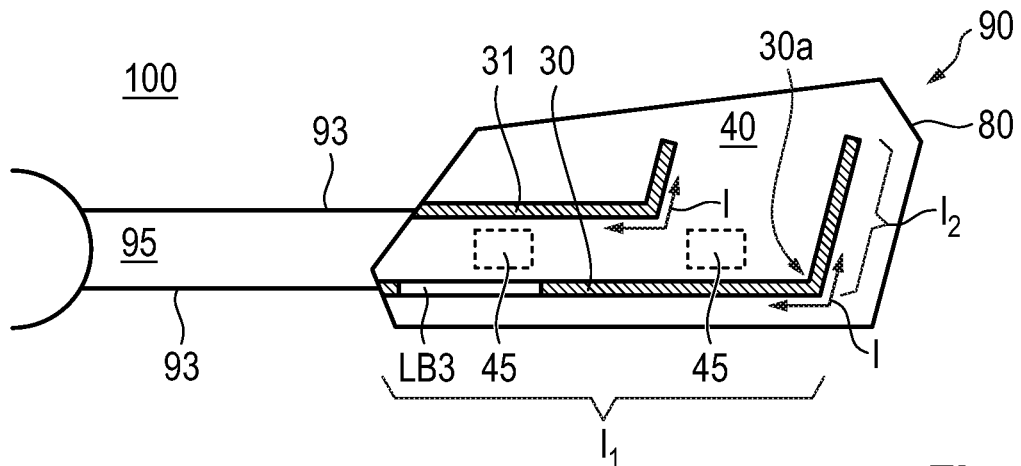
Figure 6B:
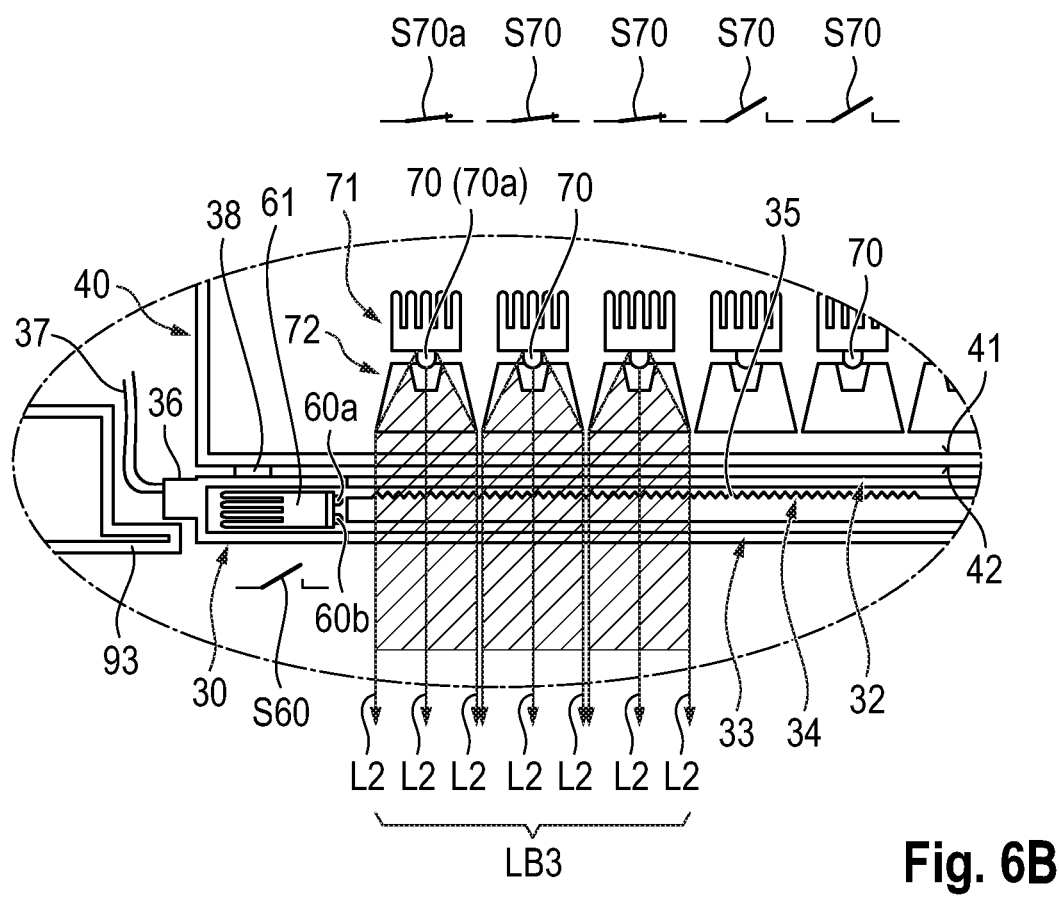

Accordingly, FIGS. 6A and 6B show a still longer illuminated region LB3, which arises when one further adjacent lamp 70 located closer to the vehicle outer side is switched on.

Figure 7A:
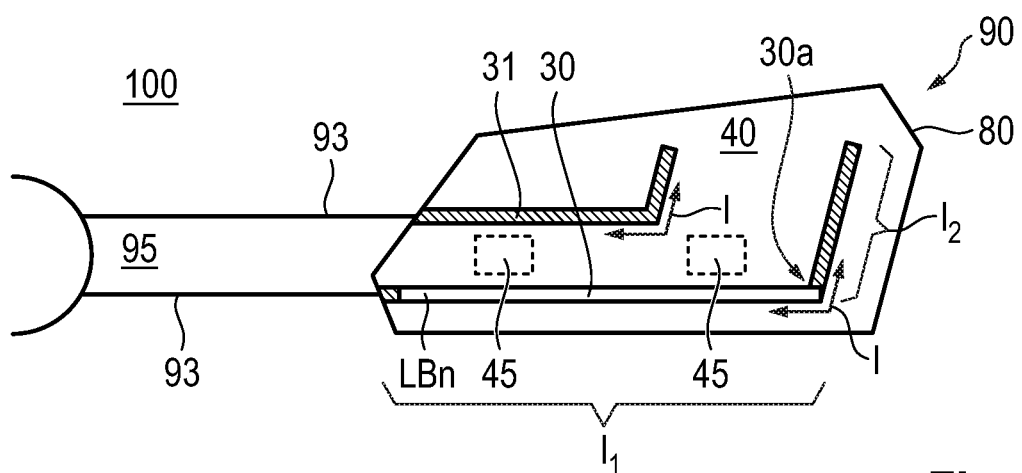
Figure 7B:
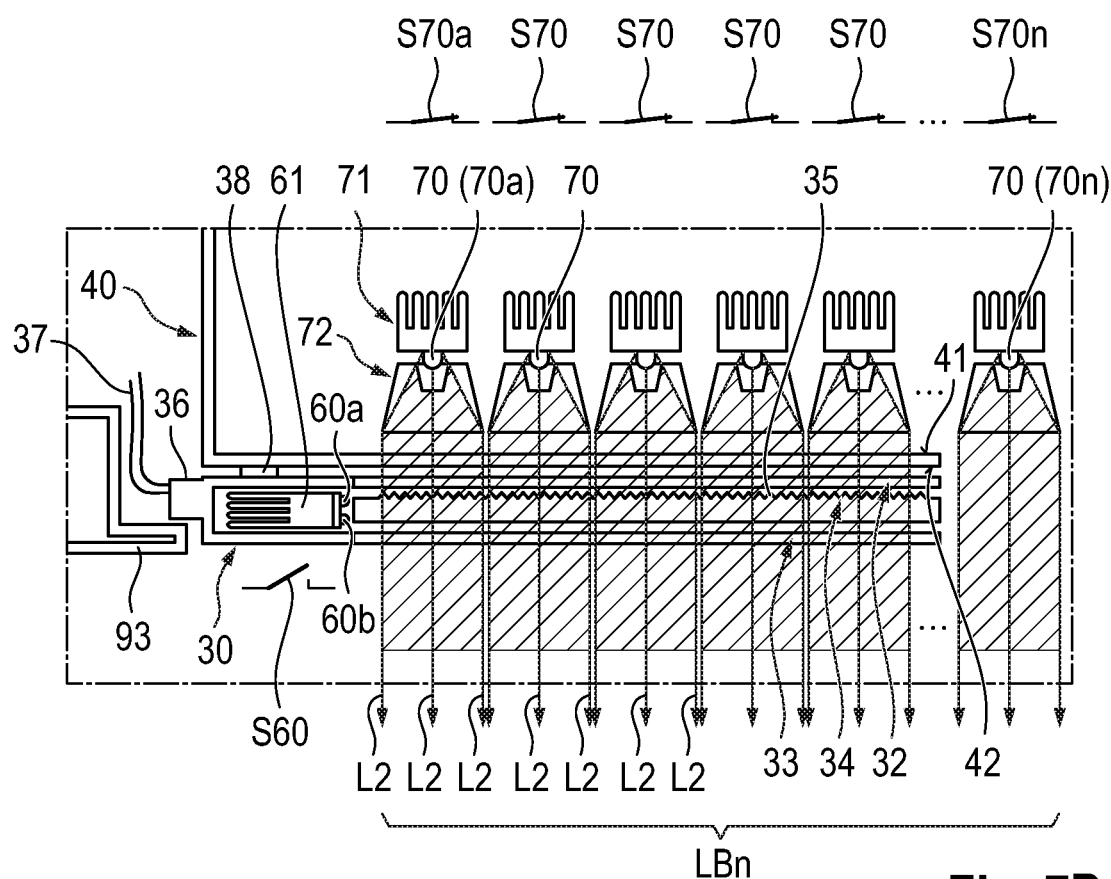
Figure 8A:
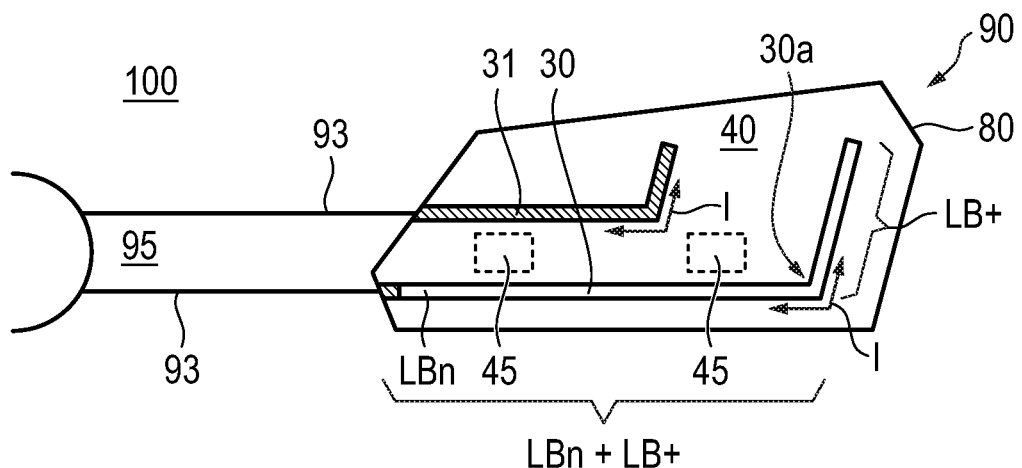
Figure 8B:
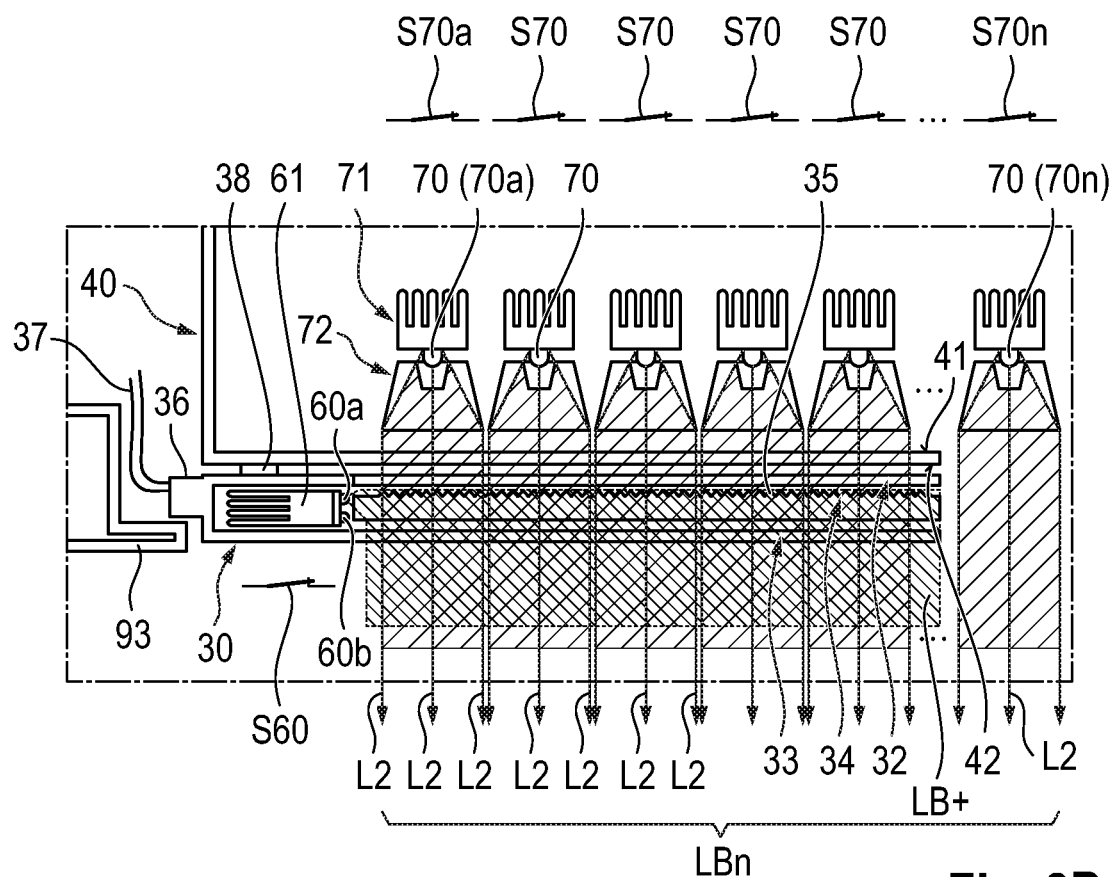

Finally, in FIGS. 7A and 7B the state is illustrated in which all lamps 70, which is to say including a lamp 70*n* located closest to the vehicle outer side, have been driven and switched on by the control device 75. As a result, an illuminated region LBn is created that fills, or at least nearly fills, the first part I1 of the length I of the front housing 30.

For reasons of space and component saving, however, no further additional lamps 70 are installed behind the second part I2 of the length I of the front housing 30. In order to also cause the part I2 to illuminate, the lamp 60a is also driven and switched on by the control device 75 at or immediately after switch-on of the lamp 70n. This has the result that an additional illuminated region LB+ appears. The illuminated region LB+ extends over the entire length I or nearly the entire length of the front housing 30, depending on the length of the light-guiding element 34, and is superimposed on the illuminated region LBn (see FIGS. 8A and 8B).

As a result of the switching on of the lamp 60a (see also switching state S60 in the form of a closed switch), not only is the second part I2 of the front housing 30 illuminated, but also a resultant illuminated region visible to an observer is optimized with regard to its homogeneity and luminosity as a result of the superposition of the illuminated region LBn and the illuminated region LB+.

It is also possible that all lamps 70 and at the same time one each of lamps 60a, 60b are switched on from the start when the motor vehicle headlamp 90 is switched on. By means of this procedure, the luminances of the lamps (70 on the one hand, and 60a or 60b on the other hand) can complement and support one another so that specific statutory values for luminance are easier to meet. However, a dynamic directional indicator or a dynamic daytime running light cannot be generated with such a procedure.

For the duration of a blinking process, all lamps 70 as well as 60a are switched off again shortly after the lamp 60a is switched on, and the procedure described in FIGS. 4a to 8a begins anew. It is repeated cyclically for the duration of the blinking process.

Figure 9:
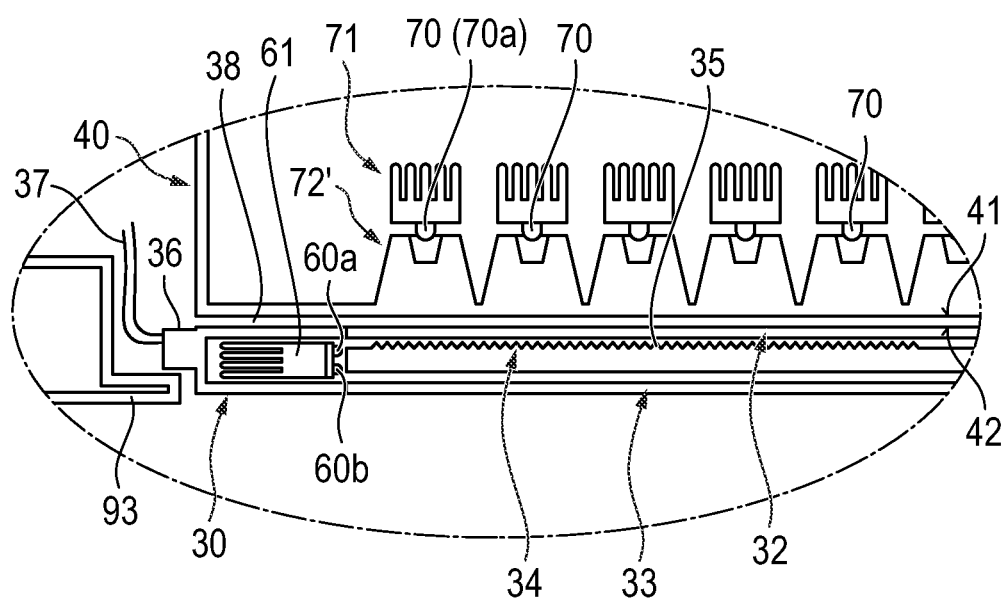
FIG. 9 is a representation of an example of the motor vehicle headlamp.

The directing optics elements 72 can also be implemented in a different manner. Thus it is possible, for example, to design the directing optics elements as directing optics elements 72' connected to the external lens 40 as a single piece (see FIG. 9). The function of the illustrated vehicle headlamp is otherwise identical to the mode of operation described above, however.

Figure 10:
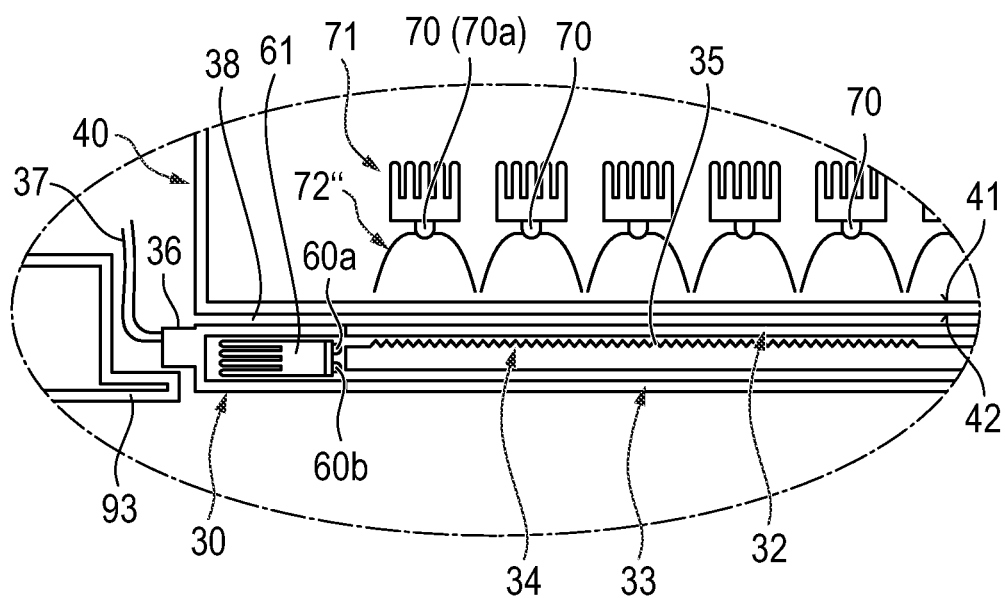
FIG. 10 is a representation of an example of the motor vehicle headlamp.

It is also possible to design the directing optics elements in the form of reflectors 72" that parallelize the light rays of the lamps 70 (see FIG. 10). In this case, too, the function of the illustrated vehicle headlamp is identical to the mode of operation described above.

Figure 11A:
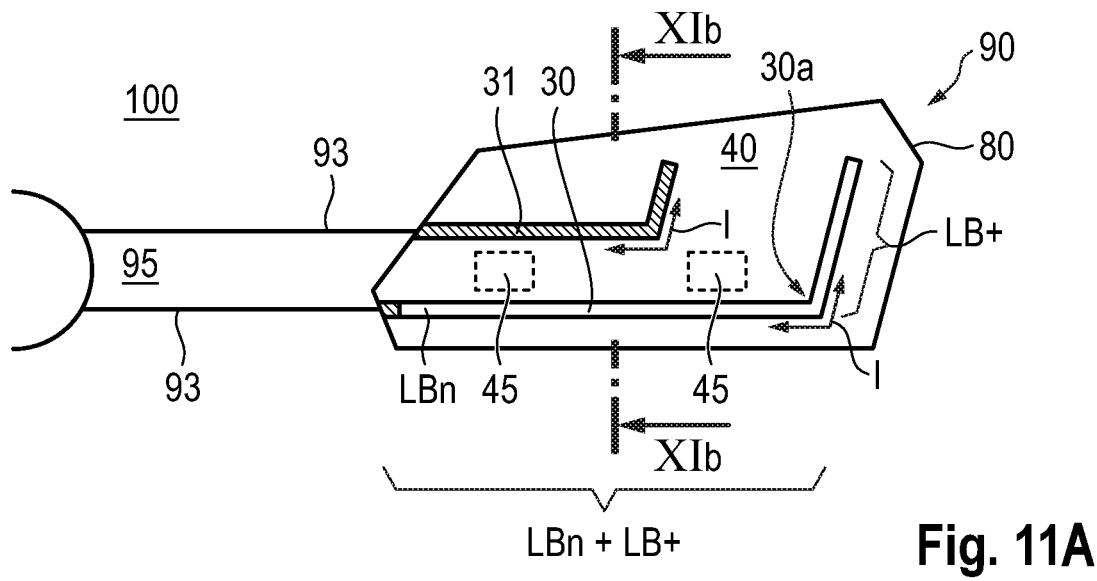
FIGS. 11A-11C are representations of an example of the motor vehicle headlamp.
Figure 11B:
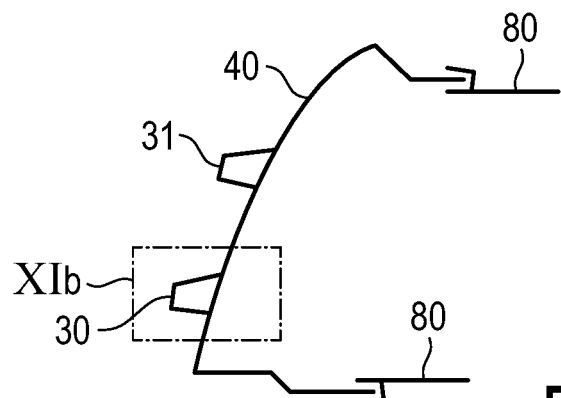
Figure 11C:
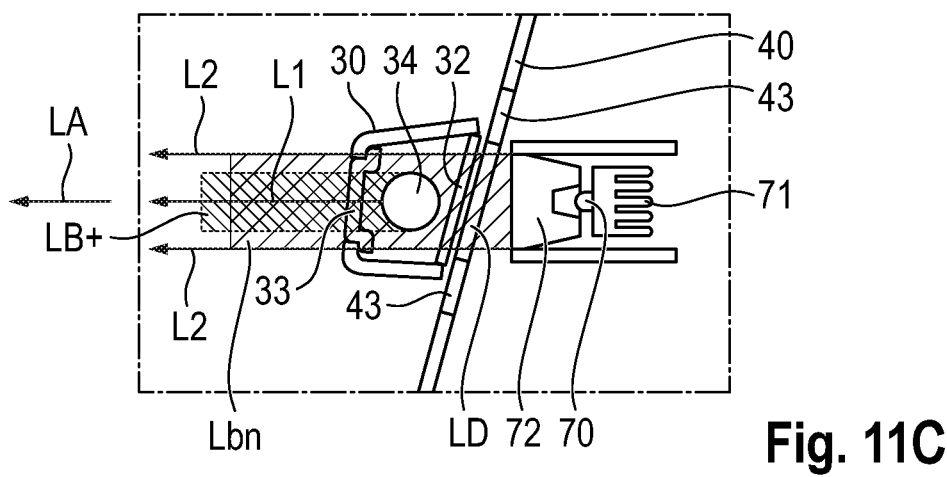

A solution is shown in FIG. 11A to 11C with which it is possible to prevent unwanted scattered light in the external lens 40. When the lamps 70 are switched on, the emitted light rays L2 pass through a light-passage region LD of the external lens 40. Opaque regions 43 are introduced into the external lens 40 above and below the light-passage region LD. It is possible, for example, that the opaque regions 43 have been introduced by a suitable laser treatment of the external lens. Other methods are possible. In this way, unwanted scattered light is prevented effectively from being produced by the emitted light rays L2 and propagating in the planar direction of the external lens 40.

Figure 12A:
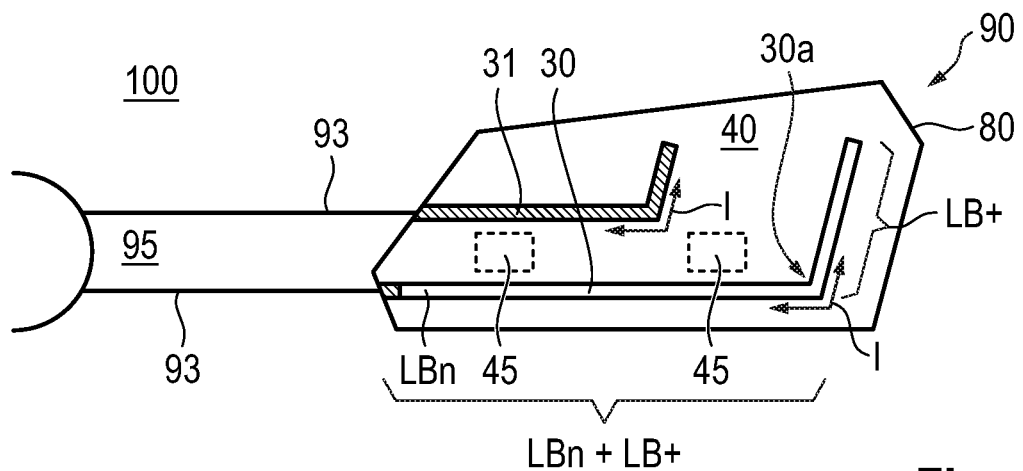
FIGS. 12A-12B are representations of an example of the motor vehicle headlamp.
Figure 12B:
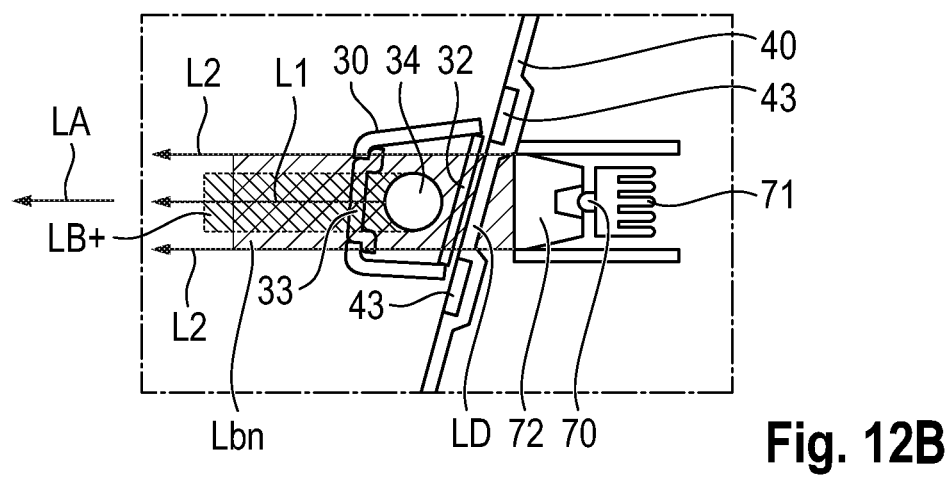
Figure 13A:
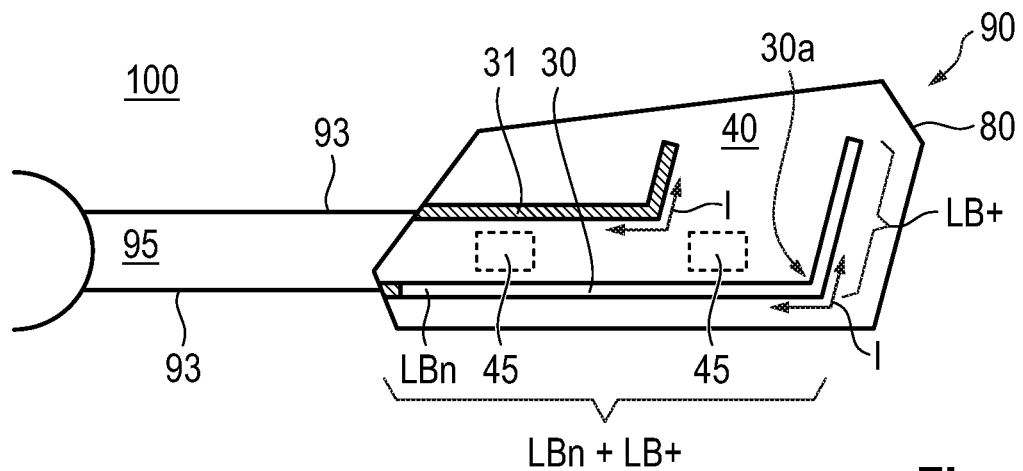
FIGS. 13A-13B are representations of an example of the motor vehicle headlamp.
Figure 13B:
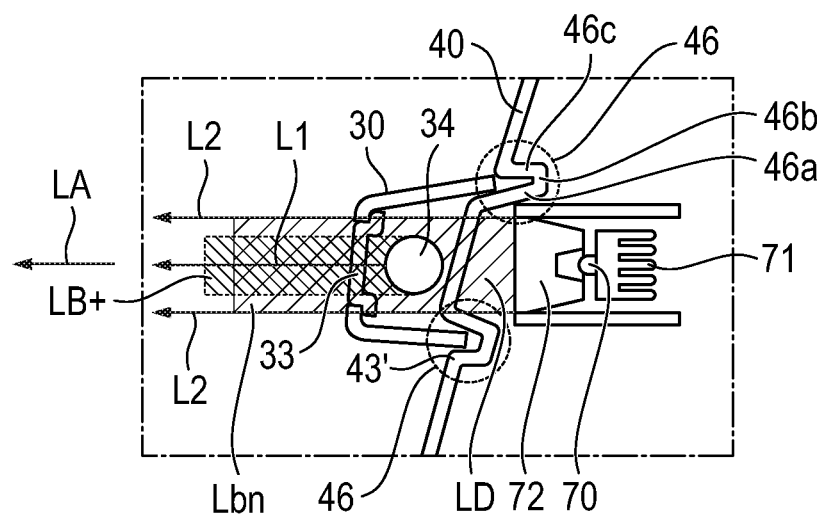

Another possibility is to design opaque regions 43' as part of two-component regions 2K. In this case, the opaque regions 43' can be realized through opaque plastic materials, for example (see FIGS. 12A and 12B).

Finally, it is also possible to design the external lens 40 in such a manner that a labyrinthine shape 46 results on both sides of the light-passage region LD when viewed in a longitudinal section of the motor vehicle headlamp 90. Thus, each labyrinthine shape 46 in the exemplary embodiment is formed by three sections 46a, 46b, and 46c (only illustrated for one labyrinthine shape 46).

Starting from and adjacent to the light-passage region LD is the section 46a, which is oriented upward or downward at an acute angle to an imaginary horizontal line opposite the direction of light emission LA. Adjoining the section 46a and at an obtuse angle thereto, the section 46b runs upward or downward. Lastly, the section 46b is adjoined by the section 46c, which in turn runs approximately horizontally and in the direction of light emission LA. Adjoining the sections 46c in turn is the external lens 40 with the remainder of its visible surface shape.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor vehicle headlamp comprising:
   a housing in which at least one main lamp is arranged;
   at least one additional lamp;
   at least one heat sink for cooling the at least one additional lamp;
   an at least partially transparent external lens that seals the housing from an outside environment of the motor vehicle headlamp and that has an inner side facing an interior of the housing and an outer side facing the outside environment;
   at least one front housing that is arranged in front of the outer side of the external lens, the at least one additional lamp being provided in the at least one front housing;
   a light-guiding element arranged in or on the at least one front housing, which light-guiding element at least partially fills an interior of the front housing and is designed to guide light rays that are coupled in via the at least one additional lamp, wherein the at least one front housing is joined to the housing and/or to the external lens of the motor vehicle headlamp in a nondestructively detachable manner by at least one fastening element; and
   at least one further additional lamp arranged in the housing of the motor vehicle headlamp and behind the light-guiding element, when viewed opposite a direction of light emission of the motor vehicle headlamp, such that light rays emitted by the at least one further additional lamp passes through the light-guiding element and through a front lens of the at least one front housing and exits toward the outside environment.

2. The motor vehicle headlamp according to claim 1, further comprising multiple of the at least one further additional lamp, such that multiple further additional lamps are provided, wherein the at least one front housing is elongate and the light-guiding element is an elongate light guide that extends over at least a large part of a length of the at least one front housing, wherein the multiple further additional lamps are arranged side by side behind the light-guiding element, the multiple further additional lamps extending at least over a large part of the length of the light-guiding element such that light rays emitted by the multiple further additional lamps pass through the light guiding element and the front lens of the at least one front housing in the direction of the outside environment.

3. The motor vehicle headlamp according to claim 2, wherein the at least one front housing is designed as a closed housing, in which the at least one additional lamp is arranged together with the light-guiding element, wherein the at least one front housing has a rear lens that extends over at least a large part of the length of the light-guiding element.

4. The motor vehicle headlamp according to claim 2, wherein at least one control device for driving the multiple further additional lamps is present such that the multiple further additional lamps are adapted to be switched on sequentially within a specific time period.

5. The motor vehicle headlamp according to claim 2, wherein the multiple further additional lamps are arranged behind a first part of the length of the light-guiding element, and no multiple further additional lamps are arranged behind a second end part of the length of the light-guiding element.

6. The motor vehicle headlamp according to claim 1, wherein the external lens of the housing has a light-passage region through which the light rays that are emitted or are emitted by the at least one additional lamp are adapted to pass, wherein opaque regions are present above and below the light-passage region, viewed in a longitudinal section of the motor vehicle headlamp.

7. The motor vehicle headlamp according to claim 6, wherein the opaque regions are part of a two-component region of the external lens.

8. The motor vehicle headlamp according to claim 6, wherein the opaque regions are incorporated into the external lens such that the light-passage region is sealed off in a light-tight manner from the rest of the external lens by the opaque regions at least toward the top and bottom, viewed in a longitudinal section of the motor vehicle headlamp.

9. The motor vehicle headlamp according to claim 6, wherein the external lens has a labyrinthine shape above and below the light-passage region viewed in a longitudinal section of the motor vehicle headlamp.

10. A method for operating a motor vehicle headlamp according to claim 2, the method comprising:
   switching on sequentially within a specific time period, in order to generate a dynamic directional indicator, all of the multiple further additional lamps, starting from one of the further additional lamps that is located closest to the vehicle inner side; and
   switching on, at substantially the same time as switch-on of another one of the further additional lamps that is located closest to the vehicle outer side or thereafter, the at least one additional lamp associated with the light-guiding element.

11. A motor vehicle for comprising at least one motor vehicle headlamp according to claim 2.

* * * * *